United States Patent [19]
Stall et al.

[11] Patent Number: 5,591,085
[45] Date of Patent: Jan. 7, 1997

[54] TRIPOD CONSTANT VELOCITY UNIVERSAL JOINT INCORPORATING A RETENTION SYSTEM FOR THE ROLLER ASSEMBLIES

[75] Inventors: Eugen Stall, Nëunkirchen; Winfried Busch, Köln, both of Germany

[73] Assignee: GKN Automotive AG, Siegburg, Germany

[21] Appl. No.: 289,094

[22] Filed: Aug. 11, 1994

[30] Foreign Application Priority Data

Aug. 12, 1993 [DE] Germany .......................... 43 27 036.0

[51] Int. Cl.⁶ .................................................. F16D 3/205
[52] U.S. Cl. ......................... 464/111; 464/123; 464/132; 464/405; 464/905
[58] Field of Search .................................. 464/111, 123, 464/124, 132, 905

[56] References Cited

U.S. PATENT DOCUMENTS

| | | | |
|---|---|---|---|
| 3,613,396 | 10/1971 | Drevard et al. | 464/111 |
| 4,886,479 | 12/1989 | Richtmeyer et al. | 464/111 |
| 5,137,496 | 8/1992 | Sasaki et al. | 464/905 X |
| 5,330,389 | 7/1994 | Jost et al. | 464/111 |
| 5,376,049 | 12/1994 | Welschof et al. | 464/123 X |
| 5,391,013 | 2/1995 | Ricks et al. | 464/111 X |

FOREIGN PATENT DOCUMENTS

| | | |
|---|---|---|
| 0532992 | 3/1993 | European Pat. Off. . |
| 2434297 | 9/1978 | France . |
| 4130963A1 | 1/1993 | Germany . |
| 4130956 | 4/1993 | Germany ........................... 464/111 |

*Primary Examiner*—Daniel P. Stodola
*Assistant Examiner*—William A. Rivera
*Attorney, Agent, or Firm*—Harness, Dickey & Pierce, P.L.C.

[57] ABSTRACT

A constant velocity universal joint of the tripode type includes a roller assembly arranged on the tripode arm which is secured against unintentionally disengagement with the tripode arm. A pressure disc is provided which holds the roller assembly together as a unit and whose shape, relative to the ideal round shape, deviates radially inwardly. The radially inwardly directed deviation in shape is designed with a slightly smaller width of opening than the dimension corresponding to the maximum outer diameter of the spherical arm. In this way it is ensured that the roller assembly on the spherical tripode arm is self-holding after having been mounted.

24 Claims, 3 Drawing Sheets

5,591,085

TRIPOD CONSTANT VELOCITY UNIVERSAL JOINT INCORPORATING A RETENTION SYSTEM FOR THE ROLLER ASSEMBLIES

FIELD OF THE INVENTION

The present invention relates to a constant velocity universal joint of the tripode type having an outer joint part provided with three circumferentially distributed, axially extending, axis-parallel guiding grooves. Each groove is provided with two associated guiding tracks. The constant velocity universal joint further comprises an inner joint part provided with spherical arms which correspond to the guiding tracks of the outer joint part and extend radially with reference to the joint axis. The spherical arms have roller assemblies arranged on the arms which consist of an inner roller and an outer roller supported on the inner roller by means of a needle bearing. Means are provided on the outer roller, which, at their end which constitutes the axially outer end with reference to the axis of the spherical arm, extend radially inwardly and which support the inner roller axially outwardly. The cylindrical inner wall of the outer roller is provided with an axially inner pressure disc which supports the inner roller axially inwardly and prevents it from being axially displaced.

BACKGROUND AND SUMMARY OF THE INVENTION

It is known in the prior art for the inner roller of a roller assembly arranged on the arm of a tripode joint to be secured against radial displacement by securing means provided on the outer roller (DE-OS 4130963). However, in the case of the embodiment described in the prior art, it is not possible to secure the entire roller assembly on the tripode arms during assembly, i.e. prior to fitting the inner joint part in the outer joint part.

It is the object of the present invention to provide holding and securing means for the complete roller assembly arranged on the spherical tripode arm of a constant velocity universal joint of the tripode type, said holding and securing means being easy to handle and not increasing the costs of the joint.

In accordance with the present invention, the objective is achieved in that the inner bore of the pressure disc, at least in one circumferentially delimited region, comprises a radially inwardly directed deviating portion. The radially inwardly directed deviating portion starts from a circle and has an opening width which is slightly smaller than the maximum outer diameter of the spherical arm. The smaller opening width, through deformation of the elastically resilient region, being suitable for being slid over the outer diameter of the spherical arm.

The advantage of the embodiment described above is that the roller assembly is available as a pre-assembled unit consisting of an inner roller, a needle bearing and an outer roller. The pre-assembled unit may be fitted simply by being slid on to the spherical arm while at the same time being prevented from automatically falling off the spherical arm.

Up to the final assembly stage when the joint is completed by fitting the inner part and outer parts, the roller assembly is securely held on the tripode arm of the inner joint part. The assembly in accordance with the invention prevents any transport problems.

According to an advantageous embodiment of the present invention, the radially inwardly directed deviating portion, which deviates from the circular shape, is formed by an inwardly pointing cam.

This invention is an easy way of achieving the objective of the invention.

According to an advantageous embodiment of the present invention, it is proposed that with reference to the axis of the spherical arm, the pressure disc is supported axially inwardly by an axial securing ring.

The advantage of this assembly is that it is possible to use an axial securing ring of the production type, with only the pressure disc having to be provided in accordance with the invention.

According to a further characteristic of the invention, the axial securing ring at the same time serves as a pressure disc.

The advantage in this case is that the axial length of the roller assembly does not have to be reduced.

According to an advantageous embodiment of the invention, the pressure disc is provided in the form of a closed ring.

With this embodiment, the elastic deformation of the pressure disc is the only means of fitting the assembly on the spherical arm, so that high holding forces are ensured.

According to a further advantageous embodiment of the invention, the pressure disc is provided with a slot.

The advantage of this feature is that relatively low manual forces are adequate for fitting the roller assembly on the spherical arm.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
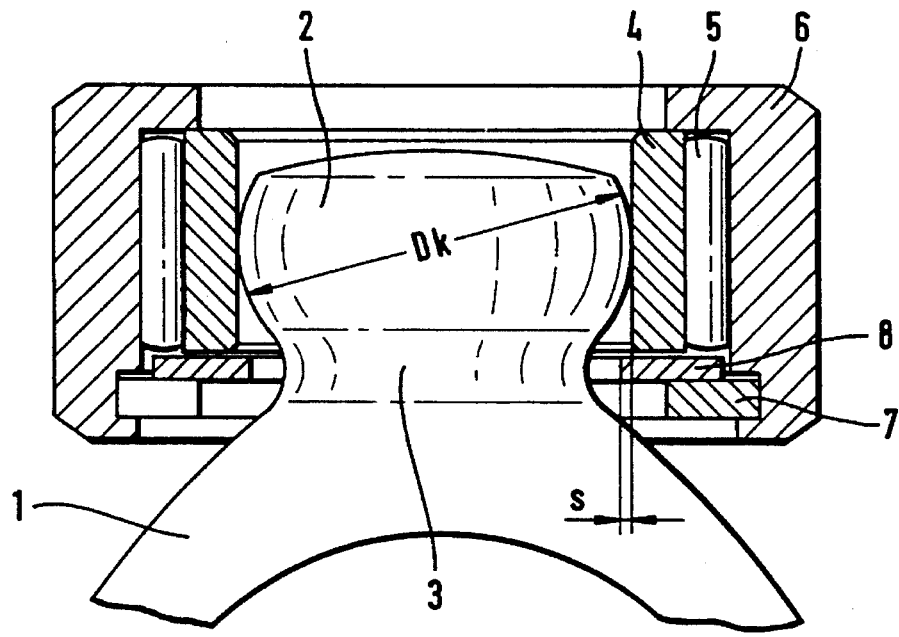
FIG. 1 is a section through an inner joint part, with the roller assembly being held on the spherical arm by means in accordance with the present invention.
Figure 2:
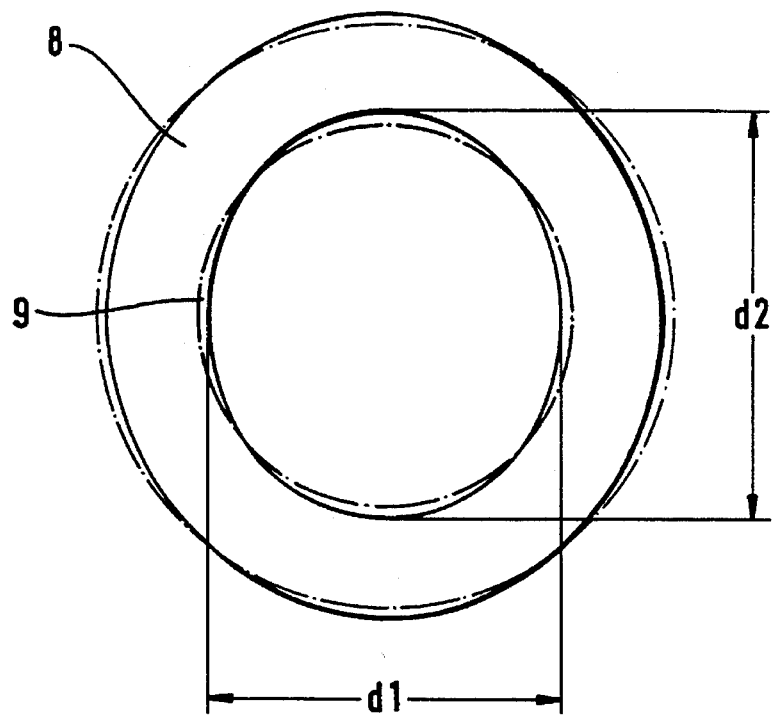
FIG. 2 shows a pressure disc with the radially inwardly directed portion deviating from the circular shape.

Referring now to the drawings in which like reference numerals designate like or corresponding parts throughout the several views, there is shown in FIG. 1 an inner joint part 1 having a spherical, radially outwardly extending arm 2 which defines a neck part 3 of the arm 2. Disposed over arm 2 is an inner roller 4 of the roller assembly and an outer roller 6. A needle bearing 5 is disposed between inner roller and outer roller 6. The entire bearing assembly is held together in the form of a complete unit by a pressure ring 8 supported by an axial securing ring 7. Referring now to FIG. 2, at the radially inwardly extending deviating portion 9, the opening width d1 of pressure ring 8 is smaller, by a dimension equal to 2×S (FIG. 1), than the outer diameter Dk of spherical arm 2.

It can be seen in FIG. 2 that in the unloaded condition, pressure ring 8 has an approximately oval shape having an inner oval opening defined by d1 and d2. Dimension d1 is less than the circular reference shown in broken lines while dimension d2 is larger than the circular reference. For holding the roller assembly on spherical arm 2, pressure ring 8 is guided by a force over spherical arm 2, as a result of which, for transport and assembly purposes, the roller assembly is secured on spherical arm 2.

Figure 3:
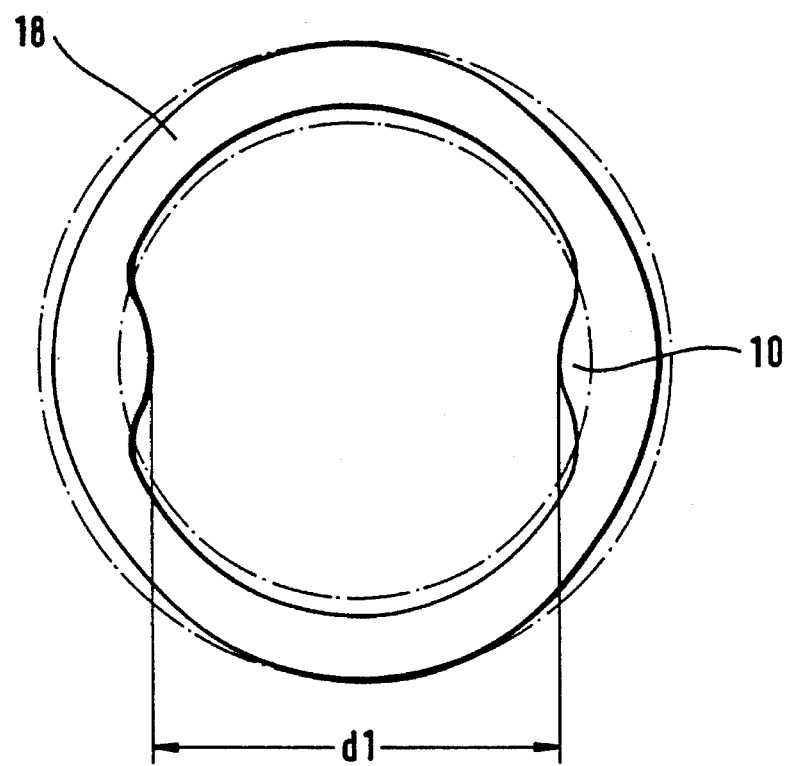
FIG. 3 shows a pressure disc with two radially inwardly pointing cams.

FIG. 3 shows a pressure disc 18 in the case of which the radially inwardly extending portion which deviates from the circular shape is formed by two cams 10.

Figure 4:
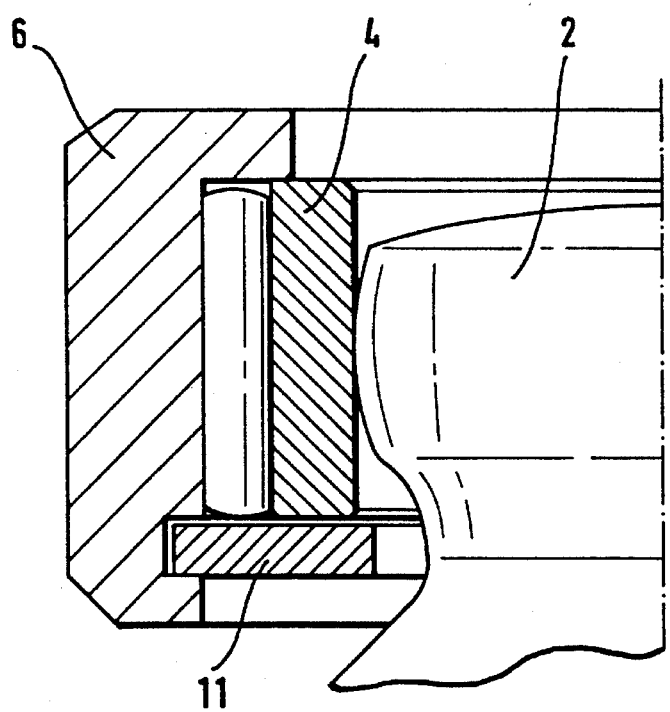
FIG. 4 is part of a section through an inner joint part having axial securing means in the form of a pressure disc.

FIG. 4 shows part of a section through a roller assembly in the case of which the axial securing means 11 at the same time serve as a pressure ring.

Figure 5:
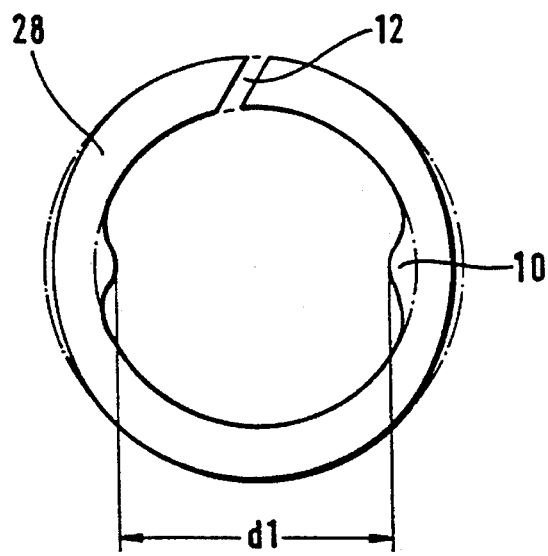
FIG. 5 shows a pressure disc provided with a slot and two radially inwardly pointing cams.

FIG. 5 shows a pressure disc 28 which is provided with a slot 12.

The pressure disc 28 as illustrated in FIG. 5 is again provided with radially inwardly extending cams 10.

Figure 6:
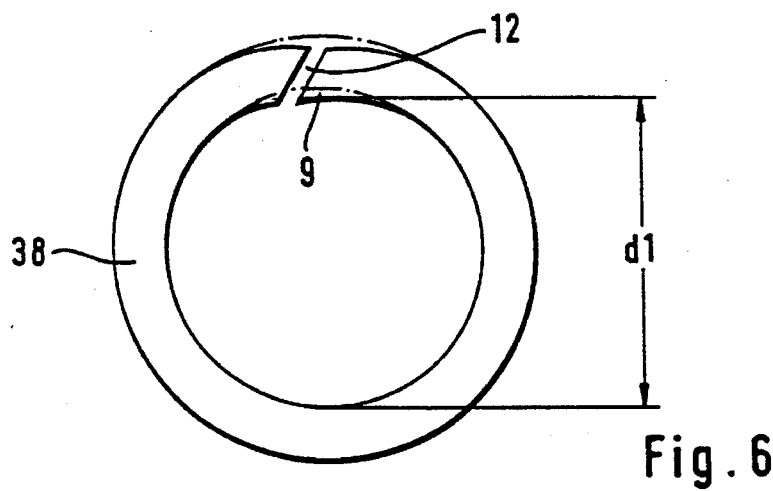
FIG. 6 shows a pressure disc provided with a slot, with the pressure disc portions adjoining the slot being deformed radially inwardly.

FIG. 6 shows a pressure disc 38 which is provided with slot 12 and in the case of which portion 9 which deviates from the circular shape is produced by radially inwardly deforming the regions adjoining slot 12.

Figure 7:
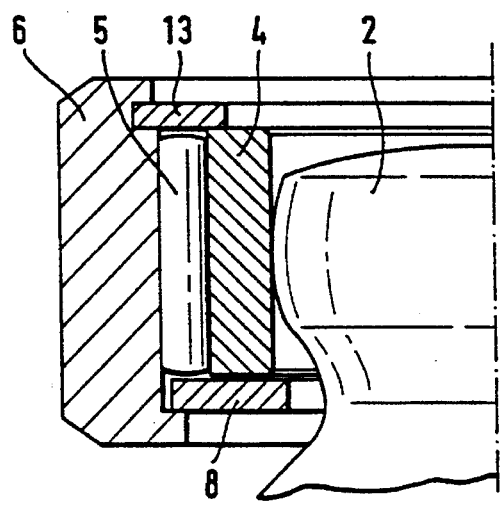
FIG. 7 is part of a section through an inner joint part with axial securing means arranged on the axial outside in the outer roller.

FIG. 7 shows part of a section through a roller assembly in the case of which inner roller 4 is axially outwardly supported relative to outer roller 6 by a further axial securing ring 13. A pressure ring 11 provides the axially inwardly directed support.

While the above detailed description describes the preferred embodiment of the present invention, it should be understood that the present invention is susceptible to modification, variation and alteration without deviating from the scope and fair meaning of the subjoined claims.

What is claimed is:

1. A tripode constant velocity joint comprising:
   an outer joint part defining an outer joint axis, said outer joint part being provided with three circumferentially distributed guiding grooves extending axially with respect to said outer joint axis;
   an inner joint part defining an inner joint axis, said inner joint part being provided with three spherical arms corresponding with said guiding grooves and extending radially with reference to said inner joint axis;
   a roller assembly arranged on each spherical arm of said inner joint part, each of said roller assemblies defining a respective roller axis and comprising:
   an inner roller;
   an outer roller disposed over said inner roller;
   a needle bearing disposed between said inner and outer roller;
   means for supporting said inner roller axially outwardly along said roller axis with respect to said outer roller; and
   an axially inner pressure disc which supports said inner roller axially inwardly along said roller axis with respect to said outer roller, said inner pressure disc defining an inner bore having a minimal opening width which is smaller than the outer diameter of said spherical arm.

2. The tripode constant velocity joint according to claim 1 wherein said axially inner pressure disc is a closed ring.

3. The tripode constant velocity joint according to claim 1 wherein said axially inner pressure disc is a split ring.

4. The tripods constant velocity joint according to claim 1 wherein said minimal opening width is defined by an inwardly pointing cam within said inner bore.

5. The tripode constant velocity joint according to claim 4 wherein said axially inner pressure disc is a closed ring.

6. The tripode constant velocity joint according to claim 4 wherein said axially inner pressure disc is a split ring.

7. The tripode constant velocity joint according to claim 1 wherein said axially inner pressure disc is supported by an axial securing ring.

8. The tripode constant velocity joint according to claim 7 wherein said axially inner pressure disc is a closed ring.

9. The tripode constant velocity joint according to claim 7 wherein said axially inner pressure disc is a split ring.

10. The tripode constant velocity joint according to claim 1 wherein said axially inner pressure disc is axially secured to said outer roller.

11. The tripode constant velocity joint according to claim 10 wherein said axially inner pressure disc is a closed ring.

12. The tripode constant velocity joint according to claim 10 wherein said axially inner pressure disc is a split ring.

13. A roller assembly adapted for a spherical arm of an inner joint part, said roller assembly defining a roller axis and comprising:
    an inner roller having a bore sized to contact said spherical arm;
    an outer roller disposed over said inner roller;
    a needle bearing disposed between said inner and outer roller;
    means for supporting said inner roller axially outwardly along said roller axis with respect to said outer roller; and
    an axially inner pressure disc which supports said inner roller axially inwardly along said roller axis with respect to said outer roller, said inner pressure disc defining an inner bore having a minimal opening width which is smaller than the outer diameter of said spherical arm.

14. The roller assembly according to claim 13 wherein said axially inner pressure disc is a closed ring.

15. The roller assembly according to claim 13 wherein said axially inner pressure disc is a split ring.

16. The roller assembly according to claim 13 wherein said minimal opening width is defined by an inwardly pointing cam within said inner bore.

17. The roller assembly according to claim 16 wherein said axially inner pressure disc is a closed ring.

18. The roller assembly according to claim 16 wherein said axially inner pressure disc is a split ring.

19. The roller assembly according to claim 13 wherein said axially inner pressure disc is supported by an axial securing ring.

20. The roller assembly according to claim 19 wherein said axially inner pressure disc is a closed ring.

21. The roller assembly according to claim 19 wherein said axially inner pressure disc is a split ring.

22. The roller assembly according to claim 13 wherein said axially inner pressure disc is axially secured to said outer roller.

23. The roller assembly according to claim 22 wherein said axially inner pressure disc is a closed ring.

24. The roller assembly according to claim 22 wherein said axially inner pressure disc is a split ring.

* * * * *